United States Patent
Maleki et al.

(10) Patent No.: US 12,193,102 B2
(45) Date of Patent: Jan. 7, 2025

(54) METHODS AND APPARATUSES FOR ADAPTIVE DISCONTINUOUS RECEPTION CONFIGURATION

(71) Applicant: Telefonaktiebolaget LM Ericsson (publ), Stockholm (SE)

(72) Inventors: Sina Maleki, Malmö (SE); Martin Van Der Zee, Malmö (SE); Ali Nader, Malmö (SE); Yutao Sui, Solna (SE); Andres Reial, Lomma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 647 days.

(21) Appl. No.: 17/290,127

(22) PCT Filed: Nov. 1, 2019

(86) PCT No.: PCT/EP2019/080002
§ 371 (c)(1),
(2) Date: Apr. 29, 2021

(87) PCT Pub. No.: WO2020/089472
PCT Pub. Date: May 7, 2020

(65) Prior Publication Data
US 2021/0400761 A1    Dec. 23, 2021

Related U.S. Application Data

(60) Provisional application No. 62/755,236, filed on Nov. 2, 2018.

(51) Int. Cl.
*H04W 76/28* (2018.01)
*H04W 72/23* (2023.01)

(52) U.S. Cl.
CPC .......... *H04W 76/28* (2018.02); *H04W 72/23* (2023.01)

(58) Field of Classification Search
CPC .............................. H04W 76/28; H04W 72/23
(Continued)

(56) References Cited

U.S. PATENT DOCUMENTS

2012/0263051 A1   10/2012   Willars et al.
2015/0201456 A1*   7/2015   Lee ........................ H04W 72/21
                                                  370/311

FOREIGN PATENT DOCUMENTS

WO   2013044415 A1   4/2013
WO   2013074015 A1   5/2013
WO   2017099726 A1   6/2017

OTHER PUBLICATIONS

International Search Report and Written Opinion dated Feb. 12, 2020 for International Application No. PCT/EP2019/080002 filed Nov. 1, 2019, consisting of 12-pages.
(Continued)

*Primary Examiner* — Nghi H Ly
(74) *Attorney, Agent, or Firm* — Weisberg I.P. Law, P.A.

(57) ABSTRACT

A method, network node and wireless device for adaptive connected discontinuous reception (C-DRX) configurations. According to one aspect, a method includes configuring a first set of short discontinuous reception, DRX, cycles and a second set of long DRX cycles, each DRX cycle having a duration for which the WD listens for an uplink grant from the network node. The method further includes transmitting to the WD at least a number of DRX cycles in the first set and a number of cycles in the second set.

19 Claims, 14 Drawing Sheets

(58) Field of Classification Search
USPC .............. 370/329, 328, 338, 341, 345, 350
See application file for complete search history.

(56) References Cited

OTHER PUBLICATIONS

3GPP TS 36.211 V15.3.0; 3rd Generation Partnership Project; Technical Specification Group Radio Access Network; Evolved Universal Terrestrial Radio Access (E-UTRA); Physical channels and modulation (Release 15), Sep. 2018, consisting of 237-pages.
3GPP TSG-RAN WG2 Meeting #95 R2-165680; Title: UE Preferred C-DRX Cycle Reporting for VoLTE; Agenda Item: 8.3.5-FS_LTE_eVOLTE; Source: Qualcomm Inc., Apple Inc., AT&T Inc., Motorola Solutions Inc., the U.S. Department of Commerce, Verizon; Document for: Discussion; Date and Location: Aug. 22-26, 2016, Göteborg, Sweden, consisting of 4-pages.
3GPP TS 36.304 V15.1.0; 3rd Generation Partnership Project; Technical Specification Group Radio Access Network; Evolved Universal Terrestrial Radio Access (E-UTRA); User Equipment (UE) procedures in idle mode (Release 15), Sep. 2018, consisting of 55-pages.
3GPP TS 36.321 V15.3.0; 3rd Generation Partnership Project; Technical Specification Group Radio Access Network; Evolved Universal Terrestrial Radio Access (E-UTRA); Medium Access Control (MAC) protocol specification (Release 15), Sep. 2018, consisting of 127-pages.
3GPP TSG-RAN WG1 Meeting #90 R1-1712621; Title: Power consumption reduction for paging and connected-mode DRX for NB-IoT; Agenda Item: 5.2.7.1.1; Source: Ericsson; Document for: Discussion, Decision; Date and Location: Aug. 21-25, 2017, Prague, Czech Republic, consisting of 9-pages.

* cited by examiner

METHODS AND APPARATUSES FOR ADAPTIVE DISCONTINUOUS RECEPTION CONFIGURATION

CROSS-REFERENCE TO RELATED APPLICATIONS

This application is a Submission Under 35 U.S.C. § 371 for U.S. National Stage Patent Application of International Application No.: PCT/EP2019/080002, filed Nov. 1, 2019 entitled "METHODS AND APPARATUSES FOR ADAPTIVE DISCONTINUOUS RECEPTION CONFIGURATION," which claims priority to U.S. Provisional Application No. 62/755,236, filed Nov. 2, 2018, entitled "MECHANISMS FOR ADAPTIVE CONNECTED-DISCONTINUOUS RECEPTION CONFIGURATIONS," the entireties of both of which are incorporated herein by reference.

FIELD

The present disclosure relates to wireless communications, and in particular, to adaptive discontinuous reception (C-DRX) configurations.

INTRODUCTION

New radio (NR) (also referred to as "5G") standards developed by the Third Generation Partnership Project 3GPP provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 orthogonal frequency division multiplex (OFDM) symbols. See FIG. 1, which shows an exemplary radio resource in New Radio. It should be noted that the concepts of slot and mini-slot are not specific to a specific service meaning that a mini-slot may be used for either eMBB, URLLC, or other services.

In release 15 (Rel-15) of the 3GPP NR standard, a WD can be configured with up to four carrier bandwidth parts (BWPs) in the downlink with a single downlink carrier bandwidth part being active at a given time. A WD can be configured with up to four carrier bandwidth parts in the uplink with a single uplink carrier bandwidth part being active at a given time. If a WD is configured with a supplementary uplink, the WD can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWPi}^{size}-1$, where i is the index of the carrier bandwidth part. A resource block (RB) is defined as 12 consecutive subcarriers in the frequency domain.

Numerologies

Multiple orthogonal frequency-division multiplexing (OFDM) numerologies, $\mu$, are supported in NR as given by Table 1, where the subcarrier spacing, $\Delta f$, and the cyclic prefix for a carrier bandwidth part are configured by different higher layer parameters for downlink (DL) and uplink (UL), respectively.

TABLE 1

Supported transmission numerologies.

| $\mu$ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink (from network node to wireless device) physical channel corresponds to a set of resource elements carrying information originating from higher layers. The following are examples of downlink physical channels:

Physical Downlink Shared Channel, PDSCH
Physical Broadcast Channel, PBCH
Physical Downlink Control Channel, PDCCH:

The PDSCH is the main physical channel used for unicast downlink data transmission, but also for transmission of RAR (random access response), certain system information blocks, and paging information. The PBCH carries the basic system information required by the WD to access the network. The PDCCH is used for transmitting downlink control information (DCI), mainly scheduling decisions, required for reception of the PDSCH, and for uplink scheduling grants enabling transmission on the PUSCH.

An uplink (from wireless device to network node) physical channel corresponds to a set of resource elements carrying information originating from higher layers. The following are examples of uplink physical channels are:

Physical Uplink Shared Channel, PUSCH:
Physical Uplink Control Channel, PUCCH
Physical Random Access Channel, PRACH The PUSCH is the uplink counterpart to the PDSCH. The PUCCH is used by WDs to transmit uplink control information, including hybrid automatic repeat request (HARD) acknowledgements, channel state information reports, etc. The PRACH is used for random access preamble transmission.

Example contents of a DL DCI 1-0 are shown and described below.

Example contents of a DCI format 1_0 with CRC scrambled by C-RNTI/CS_RNTI

Identifier for DCI formats—1 bits

The value of this bit field is always set to 1, indicating a DL DCI format Frequency domain resource assignment —$\lceil \log_2(N_{RB}^{DL,BWP} (N_{RB}^{DL,BWP}+1)/2) \rceil$ bits $N_{RB}^{DL,BWP}$ is the size of the active DL bandwidth part in case DCI format 1_0 is monitored in the WD specific search space and satisfying the total number of different DCI sizes configured to monitor is no more than 4 for the cell, and the total number of different DCI sizes with C-RNTI configured to monitor is no more than 3 for the cell otherwise, $N_{RB}^{DL,BWP}$ is the size of CORESET 0.

Time domain resource assignment—may be 4 bits as defined for example in Subclause 5.1.2.1 of [6, 3GPP Technical Specification (TS) 38.214]

VRB-to-PRB mapping—may be 1 bit according to, for example, 3GPP technical standards Modulation and coding scheme—may be 5 bits, for example, as defined in Subclause 5.1.3 of [6, TS 38.214]

New data indicator—may be 1 bit

Redundancy version—may be 2 bits, for example, as defined in 3GPP technical standards HARQ process number—may be 4 bits Downlink assignment index—may be 2 bits, for example, as defined in Subclause 9.1.3 of [5, TS 38.213], as counter DAI TPC command for scheduled PUCCH—may be 2 bits, for example, as defined in Subclause 7.2.1 of [5, TS 38.213]

PUCCH resource indicator—may be 3 bits, for example, as defined in Subclause 9.2.3 of [5, TS 38.213]

PDSCH-to-HARQ_feedback timing indicator—may be 3 bits, for example, as defined in Subclause 9.2.3 of [5, TS38.213]

DRX

DRX (Discontinuous reception): As shown in the simplified DRX operation of FIG. 2, DRX allows the WD to transition to lower power state where it is not required to receive any transmission from the base station. There is an onDuration where the WD is awake and monitors for control channels. If there is no control message detected by the WD, an Inactivity timer begins, and the WD continues to monitor for a control channel until a valid control message addressed to the WD is received or the inactivity timer expires. If the WD receives a valid control message, it extends the Inactivity timer and continues to monitor the PDCCH. If the inactivity timer expires then the WD can stop receiving transmissions from the base station (e.g., no control monitoring) until end of the DRX cycle. Typically, the DRX parameters are configured by Radio Resource Control (RRC) and there are some other DRX parameters including round trip time (RTT) related parameters, HARQ related parameters, etc. The on duration and the time duration when the inactivity timer is running is also generally referred to as active time.

In summary the following terms are typically associated with DRX operation

Active Time: Time related to DRX operation, during which the medium access control (MAC) entity monitors the PDCCH.

DRX Cycle: Specifies the periodic repetition of the On Duration followed by a possible period of inactivity as shown in FIG. 2.

Inactivity Timer: Generally, refers to the number of consecutive PDCCH-subframe(s)/slots after the subframe/slot in which a PDCCH indicates an initial UL, DL or side link (SL) user data transmission for a MAC entity.

MAC entity is the medium access control entity, and there is one MAC entity per configured cell group, for example the master cell group and secondary cell group.

One aspect is that DRX functionality is configured by RRC, which is typically operating at a slower scale than the MAC or physical layer. Thus, the DRX parameter settings, cannot be changed adaptively through RRC configuration, especially if the WD has a mix of traffic types.

Another type of discontinuous reception mechanism is the connected mode discontinuous reception (C-DRX) mechanism.

In the current C-DRX mechanisms, the WD is configured with two fixed values for a short and long C-DRX cycle which are pre-configured by the network node (for example, a base station, gNB). After a number of inactive short DRX cycles, the WD moves to the long DRX cycle. Put another way, the WD is configured with a long DRX, or a short and a long DRX cycle. In cases where the WD does not receive a grant over the ON duration, or after the inactivity timer is expired, the WD moves to the short DRX cycle (or a long cycle directly if a short cycle is not configured), and stays there for a preconfigured amount of time, and if still no grant is received, the WD moves to the long DRX cycle until the next ON duration. In current implementations, the value of the cycle lengths are fixed and can be reconfigured with RRC or MAC control element (CE) mechanisms.

The WD typically is configured to decode all PDCCH occasions according to a search space, which can be specified by configured control resource sets (CORSETS). The WD performs blind detection in its CORSETS to identify whether the PDCCH was intended for it, based on checking the cyclic redundancy check (CRC) using its radio network temporary identifier (C-RNTI).

PDCCH monitoring accounts for a significant percentage of WD power consumption. Furthermore, in typical practical scenarios a significant number of PDCCH monitoring occasions contain no DL/UL grant, which leads to wasted power consumption at the WD. The C-DRX mechanism aims to reduce the number of PDCCH monitoring occasions with no DL/UL grant. However, problems with this mechanism still remain: studies have shown that despite this mechanism, the WD still wastes a lot of energy on dummy PDCCH monitoring during the ON periods after the DRX cycle.

SUMMARY

Some embodiments advantageously provide methods, network nodes and wireless devices for adaptive connected discontinuous reception configurations. Some embodiments provide mechanisms to make the choice of DRX cycle more adaptive than the current fixed setup of short and long DRX. In order to do so a number of approaches can be followed which are summarized below. The ordering of the methods is chosen with respect to the frequency that the network needs to do the reconfiguration, otherwise, it does not necessarily reflect the importance of the method.

Several example methods for adaptive C-DRX are discussed below.

Method 1:

In some embodiments, the network, such as via a network node, configures the WD with a set of short and a set of long DRX cycles instead of the current set of two fixed values (i.e. one fixed short cycle value and one fixed long cycle value). Following an ON duration, the WD may choose a starting cycle value from the short DRX cycle set based on the pre-configured approach indicated by the network node. If the WD does not receive any scheduling PDCCH in any of the following ON durations, the WD may choose the next value from the set for a number of N DRX cycles or a time set by inactivity timer, where N is an integer greater than 1. Expressed another way, in some embodiments the wireless device selects a starting short DRX cycle value from the short DRX cycle set; if no PDCCH is received in the 'on duration' for that cycle, another short DRX cycle value from the set is chosen and PDCCH monitoring is performed using that chosen cycle value. This process is repeated by selecting successive short DRX cycle values from the set and performing PDCCH monitoring using the selected cycle values.

If the WD has not received a grant during the N short DRX cycles, then it may enter a long DRX mode, and choose the first value from the long DRX set, again based on the pre-configured technique indicated by the network node, and follow the same procedure as in the previous case, (i.e., choosing the next value of DRX cycle from the long DRX cycle set after every inactive ON duration). This may continue until the WD receives a grant or when the WD returns to the default mode, again preconfigured by the network node.

In this method, the WD may also, if allowed by the network node, provide limited assistance information to the network node, so that the network node can choose the sets taking this information into account.

With respect to the current C-DRX configuration, this method may involve additional reconfiguration parameters, e.g., the set of DRX values, the starting values, the approach to increase the cycle duration, the number of DRX cycles the WD stays within each mode. Further, in some embodiments, the network node may also use DCI based signaling in the previous ON duration to perform a reconfiguration if needed. Thus, the network node can optionally take WD assistance into account.

Method 2:

In another approach, the WD may assist the network node to configure the C-DRX cycle based on the information received from the WD such as DRX cycle information, power, BW, type of traffic, latency, etc. The network node can then consider this information in order to devise the DRX cycle more efficiently. However, the network node can also ignore this assistance information in some embodiments, in which case the WD keeps the current C-DRX configuration.

Compared to Method 1, in this method, the network node and the WD may be more interactive with each other with respect to C-DRX configurations, and thus the C-DRX settings can be reconfigured more dynamically, as determined by the network node.

Other example methods and embodiments will be described below.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
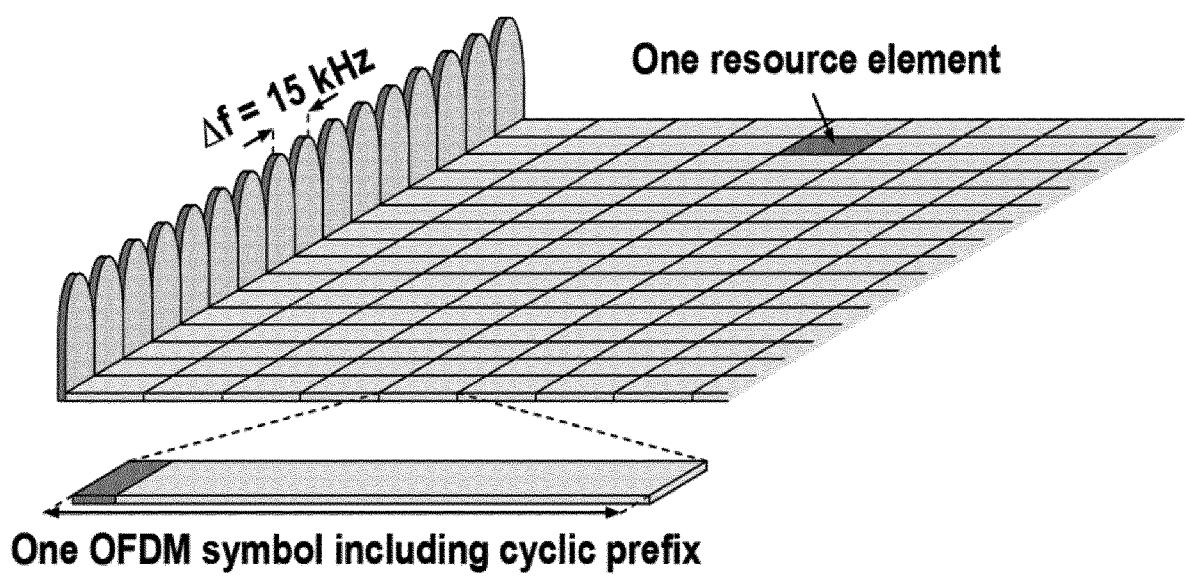
FIG. 1 illustrates an exemplary radio resource in New Radio.
Figure 2:
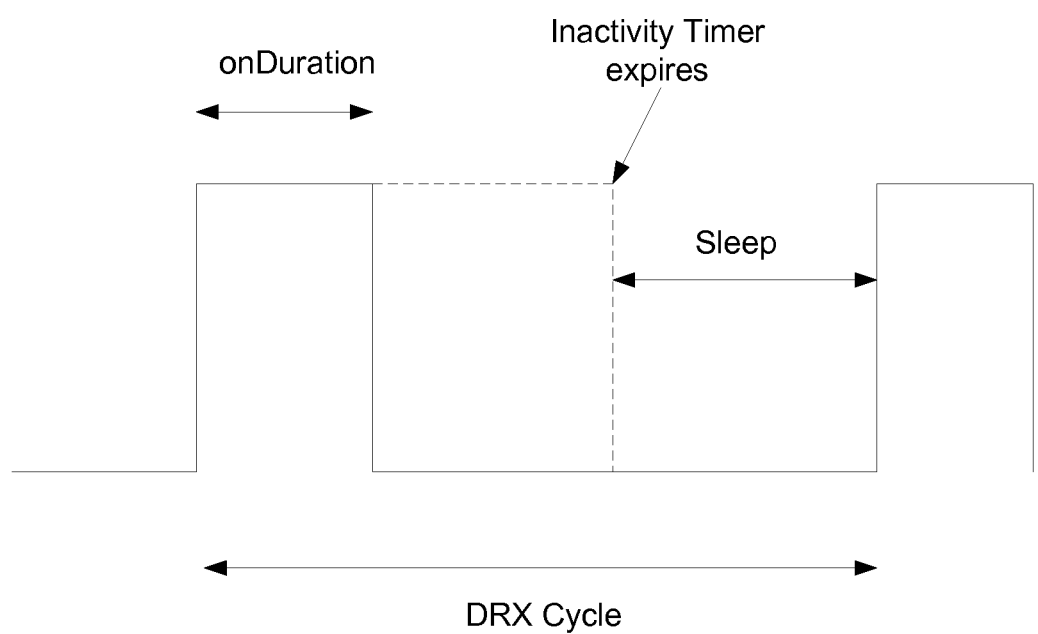
FIG. 2 illustrates a DRX cycle having periodic repetition of an ON DURATION followed by a possible period of inactivity.

Methods, network nodes and wireless devices for adaptive connected discontinuous reception configurations are described in detail. Before describing in detail exemplary embodiments, it is noted that the embodiments reside primarily in combinations of apparatus components and processing steps related to mechanisms for adaptive connected discontinuous reception (C-DRX) configurations. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH). Note also, that when a network is referred to herein as performing a function, the function may be performed by a network node such as a base station, such as a gNB.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide mechanisms for making a choice of DRX cycle more adaptive than the current fixed setup of short and long DRX cycles. In order to do so, a number of approaches can be followed which are summarized below. The ordering of the methods is chosen with respect to the frequency by which the network, (e.g., gNB) performs the reconfiguration.

Figure 3:
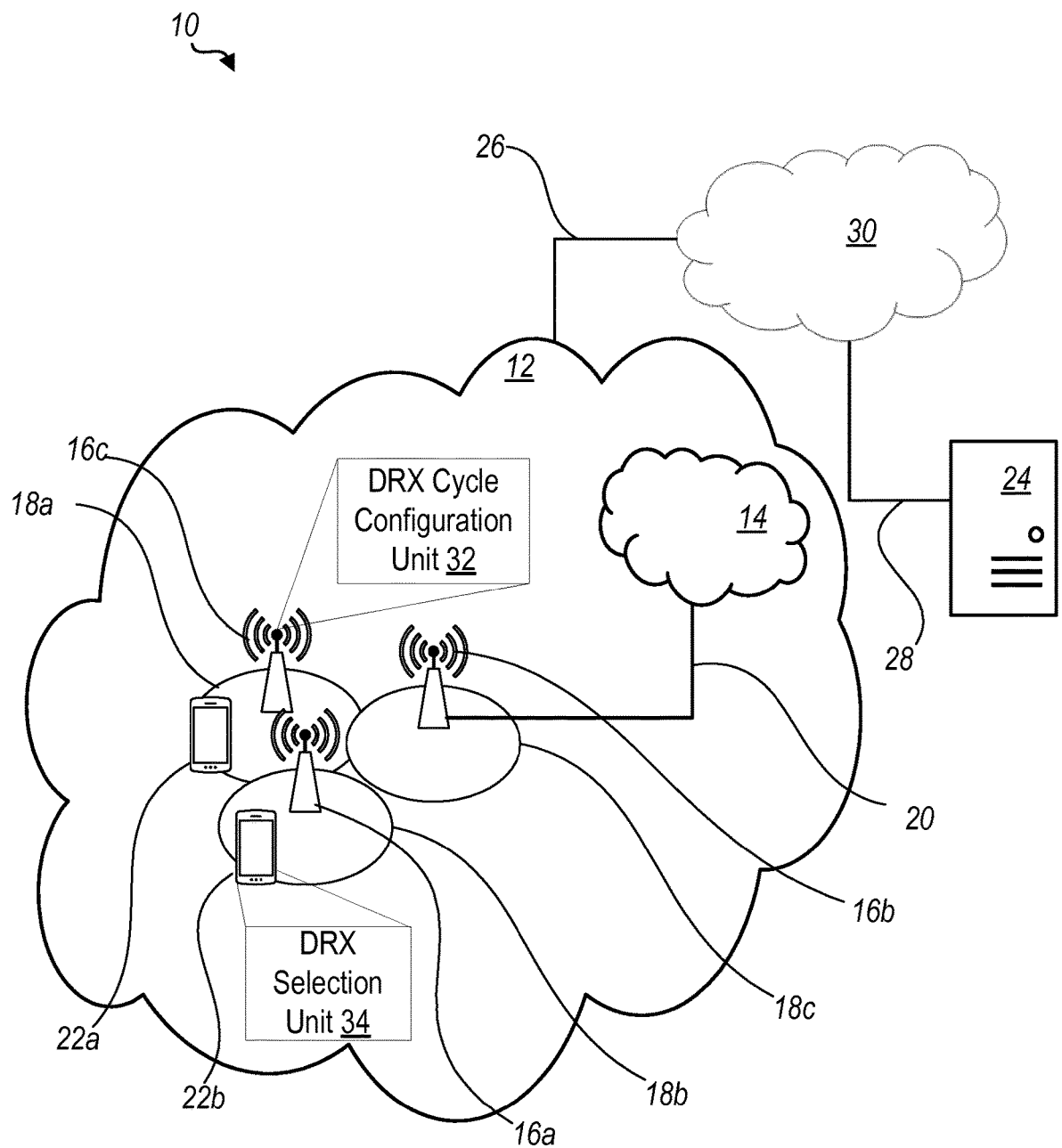
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a DRX Cycle Configuration unit 32 which is configured to configure a first set of short discontinuous reception, DRX, cycles and a second set of long DRX cycles. A wireless device 22 is configured to include a DRX Selection unit 34 which is configured to select a DRX cycle.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a DRX Cycle Configuration unit 32 which is configured to configure a first set of short discontinuous reception, DRX, cycles and a second set of long DRX cycles.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a DRX Selection unit 34 which is configured to select a DRX cycle.

Figure 4:
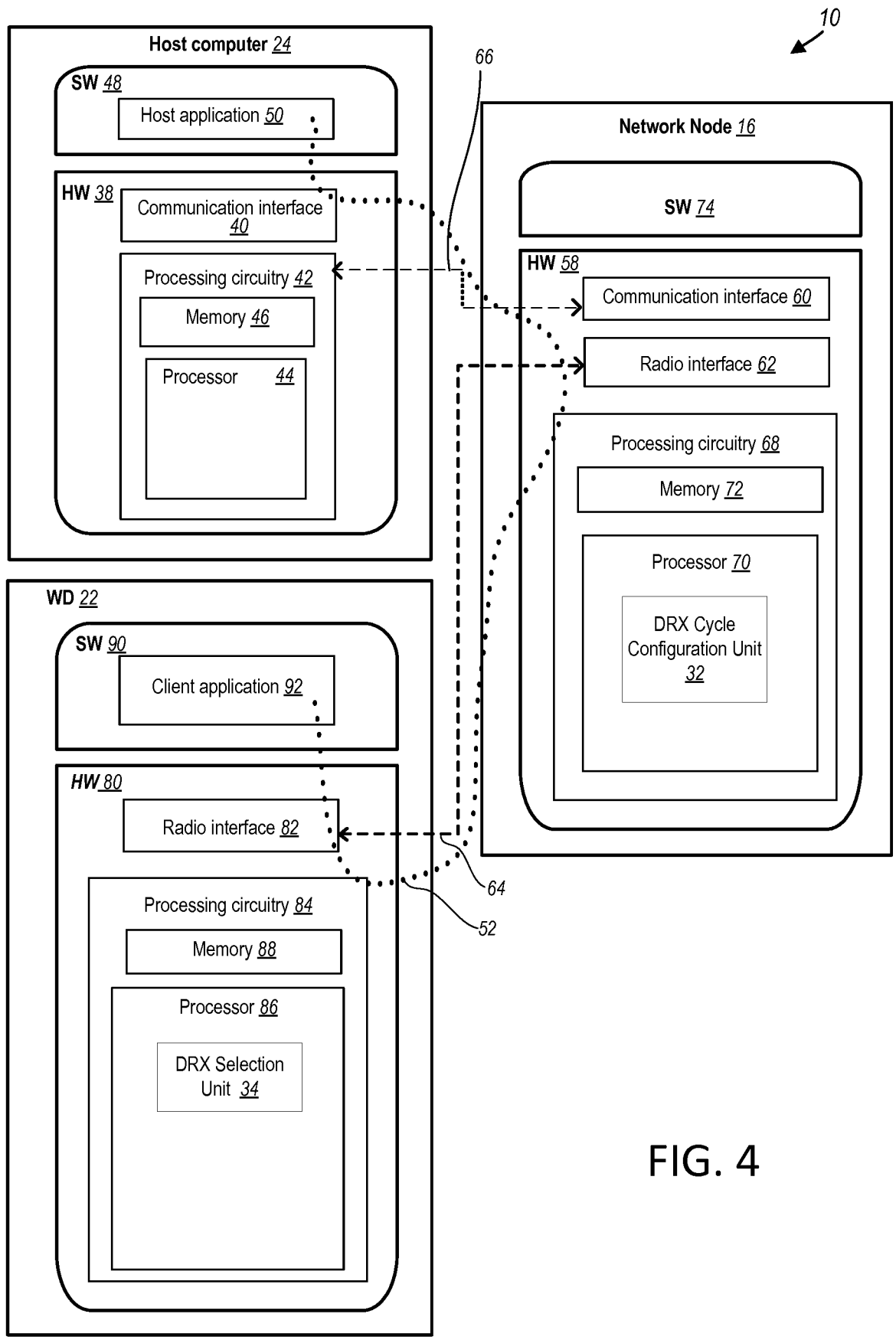
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as DRX Cycle Configuration unit 32, and DRX Selection unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
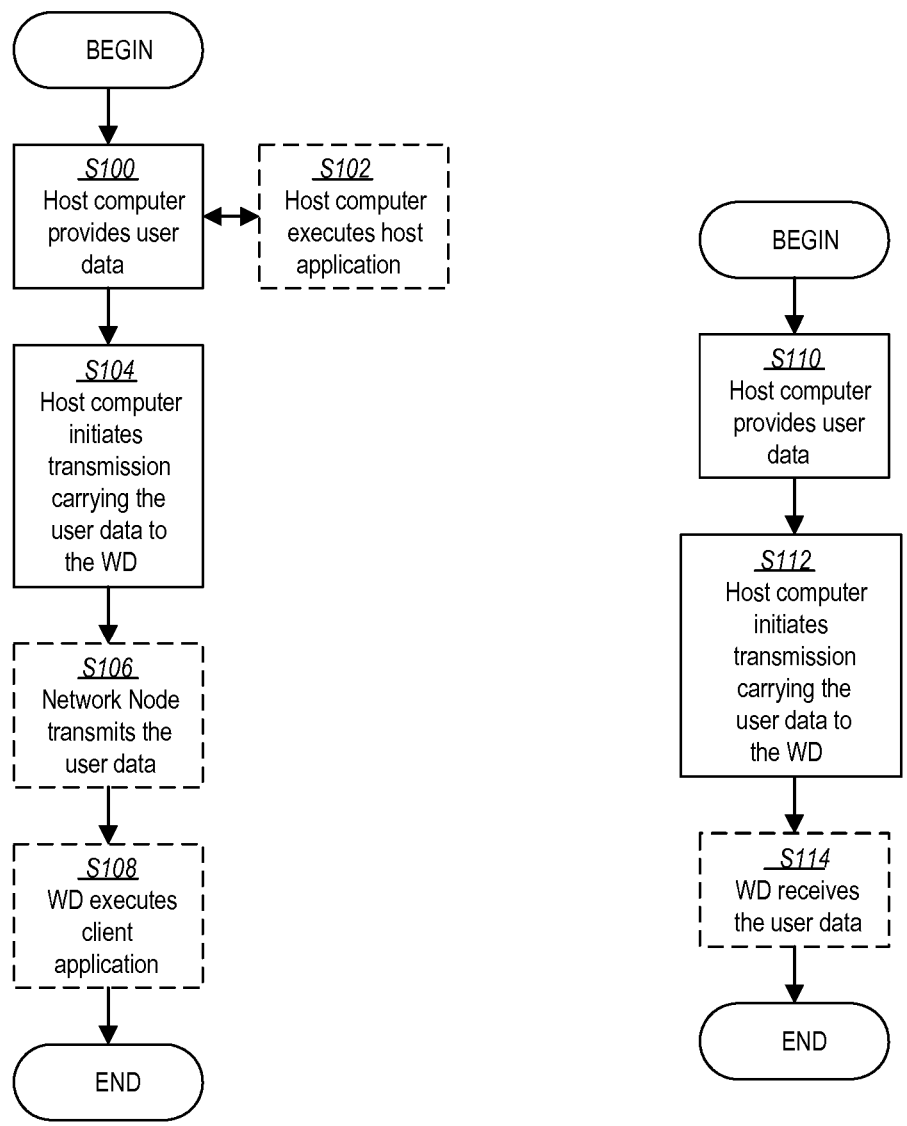
FIG. 5 is a flowchart illustrating exemplary methods implemented in a communication system including a host computer, a network node and a wireless device for executing a client application at a wireless device according to some embodiments of the present disclosure.
FIG. 6 is a flowchart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 7:
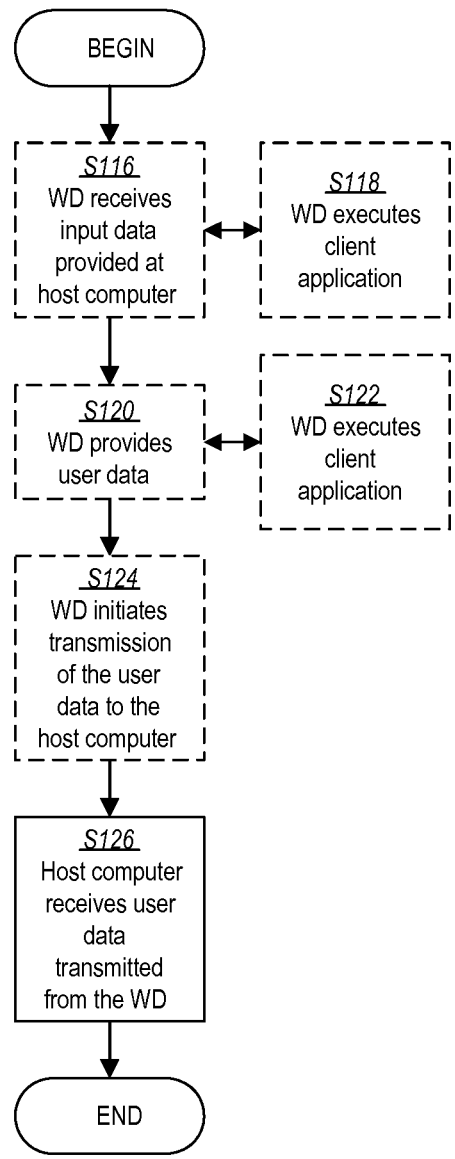
FIG. 7 is a flowchart illustrating exemplary methods implemented in a communication system including a host computer, a network node and a wireless device for receiving user data from the wireless device at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 8:
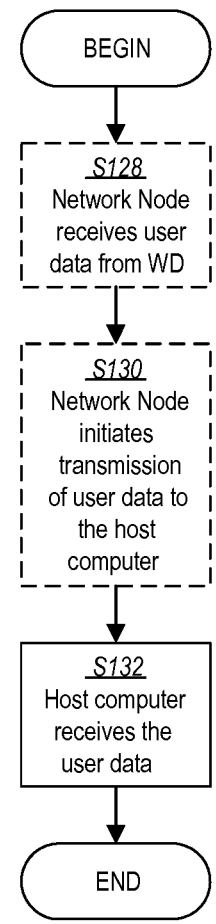
FIG. 8 is a flowchart illustrating exemplary methods implemented in a communication system including a host computer, a network node and a wireless device for receiving user data at a host computer according to some embodiments of the present disclosure.

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Several example embodiments for adapting discontinuous reception configurations will now be described. These example embodiments are generally grouped into a first set of approaches (referred to as Method 1) and a second set of approaches (referred to as Method 2).

Figure 9:
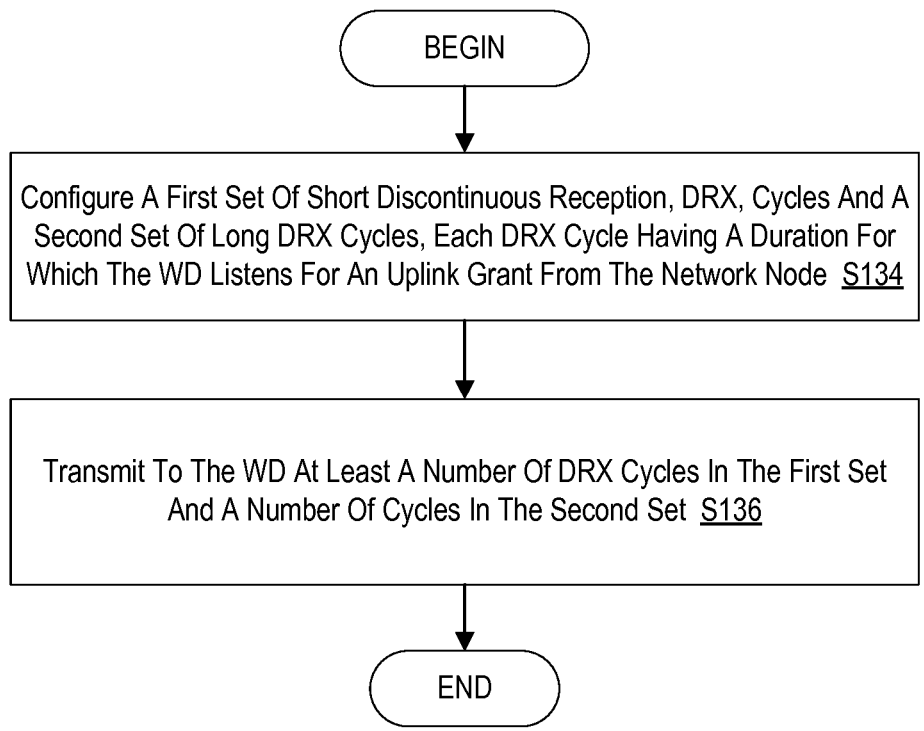
FIG. 9 is a flowchart of an exemplary process in a network node according to some embodiments of the present disclosure.

Method 1:

FIG. 9 is a flowchart of an exemplary process in a network node 16 according to some embodiments of the present disclosure. One or more Blocks and/or functions performed by network node 16 may be performed by one or more elements of network node 16 such as by DRX cycle configuration unit 32 in processing circuitry 68, processor 70, radio interface 62, etc.

The process includes configuring, such as via the DRX Cycle Configuration unit 32, a first set of short discontinuous reception, DRX, cycles and a second set of long DRX cycles, each DRX cycle having a duration for which the WD listens for an uplink grant from the network node (Block S134). The process also includes transmitting, such as via the radio interface 62, to the WD at least a number of DRX cycles in the first set and a number of cycles in the second set (Block S136).

Figure 10:
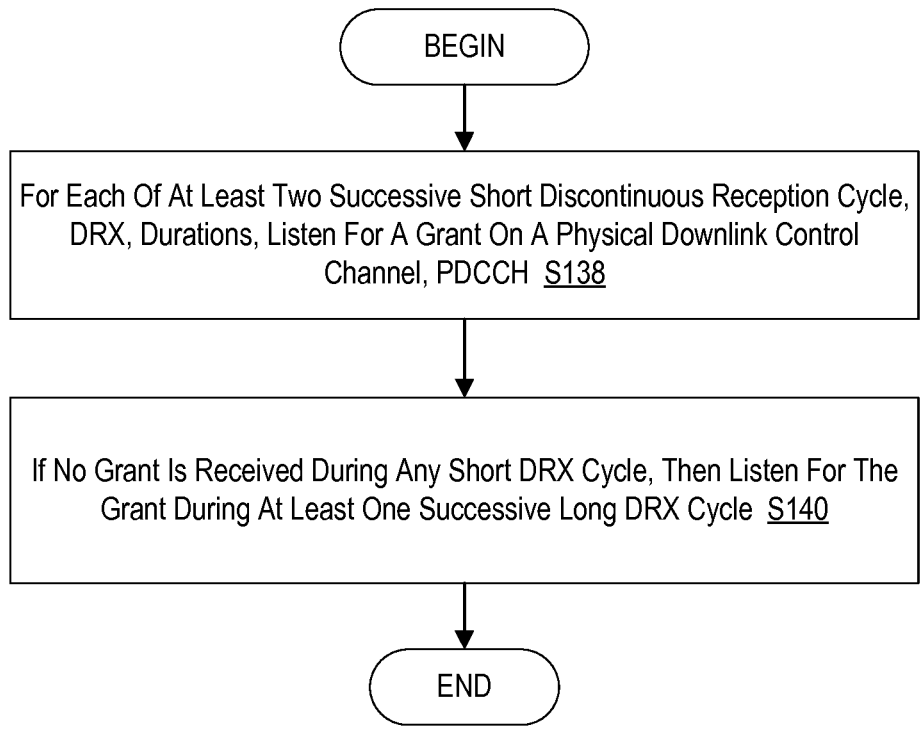
FIG. 10 is a flowchart of an exemplary process in a wireless device according to some embodiments of the present disclosure.

FIG. 10 is a flowchart of an exemplary process in a wireless device 22 according to some embodiments of the present disclosure. The process includes, for each of at least two successive short discontinuous reception cycle, DRX, durations listening, such as via the processing circuitry 84 and/or the DRX Selection unit 34, for a grant on a physical downlink control channel, PDCCH (Block S138). The process also includes, if no grant is received during any short DRX cycle, then listening, such as via the processing circuitry 84 and/or the DRX Selection unit 34, for the grant during at least one successive long DRX cycle (Block S140). Note that one or more Blocks and/or functions performed by wireless device 22 may be performed by one or more elements of wireless device 22 such as by DRX Selection unit 34 in processing circuitry 84, processor 86, radio interface 82, etc.

Usually the WD 22 has a mixed type of traffic, as several different applications can typically run at the same time in the higher layer. Therefore, it may be difficult to come up with an optimal DRX setting that can achieve a good balance between the WD 22 power saving and reachability/communication delays. Therefore, an adaptive method for the WD 22 to determine a suitable DRX duration setting in a given time is provided by allowing the WD 22 to test different DRX settings while communicating with the gNB. Moreover, the network node may also be configured to reset the settings, e.g., when the WD 22 traffic situation changes.

In this method, the network node 16 may configure the WD 22 through RRC signaling, for example, with a set of increasing DRX cycles for the short DRX, e.g., {2 ms, 4 ms, . . . , 320 ms} and a set of increasing long DRX cycles for the long one, e.g. {320 ms, 640 ms, . . . , 10240 ms}. After the first ON duration, the WD 22 may switch to the short DRX cycle and choose a value from the set of short DRX cycles. In some embodiments, the network node 16 can configure the WD 22 with a different starting value of DRX cycle. The WD 22 may then stay within a short DRX mode for a preconfigured N number of DRX cycles or a short DRX inactivity timer. Within this period, the WD 22 may remain inactive, i.e., does not receive a scheduling PDCCH. The WD 22 then chooses the next value from the short DRX set. The network node 16 may also preconfigure the WD 22 with an approach for choosing the next value, for example, the next value in the set.

In case it turns out that the WD 22 remains inactive after the short DRX set time is finished, the WD 22 then moves to the long DRX set mode. The WD 22 can choose the first long DRX cycle. A duration of successive long DRX cycles may be specified by the network node 16 and a next long DRX cycle may be chosen according to a method or rule configured by the network node, in case the WD 22 remains inactive. For example, the WD 22 can be configured to choose the first value of the long DRX set, and then gradually increase the DRX cycle duration by choosing the next value in the set. This can continue until the WD 22 receives a scheduling PDCCH which means the WD 22 may go back to the default C-DRX mode. I.e., in the next occasion, the WD 22 may start again with the starting setting of short DRX.

Figure 11:
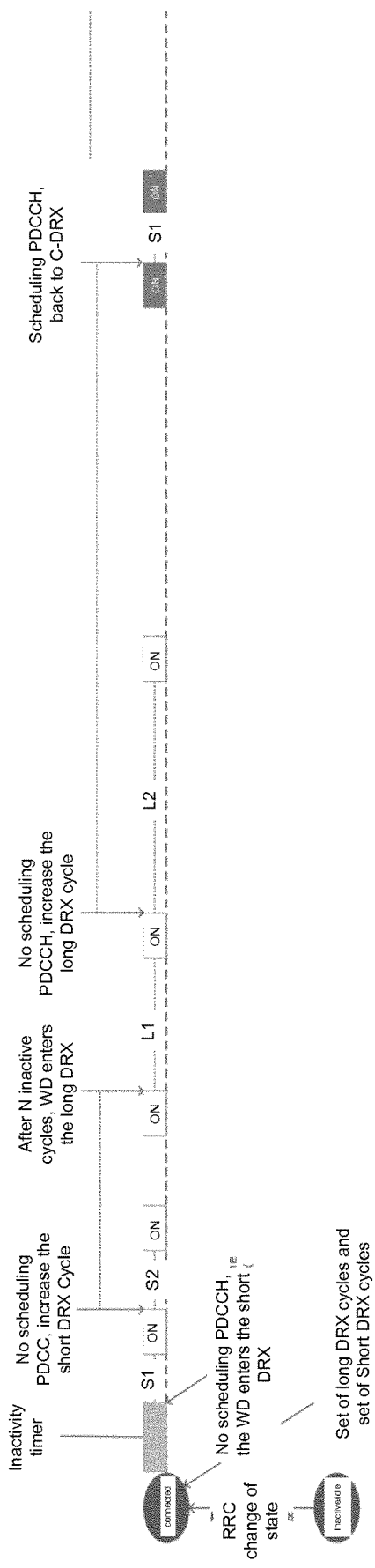
FIG. 11 illustrates timing of DRX cycles according to principles set forth herein.

An example of this method is schematically shown and described in FIG. 11.

In another embodiment of this method, the network node may configure the WD 22 with two reference values for short and long DRX, and an offset or a set of offsets to increase or decrease the DRX cycle as may be defined by the network node 16.

In another embodiment of this method, the WD 22 can report the quality service requirement of each of the bearers it sets up (different applications can set up different bears). Then network node 16 can then decide the set of DRX parameters based on all the bearers the WD 22 sets up.

In another embodiment, the WD 22 can provide assistance information to the network node for choosing the set of DRX values, or the offset. However, the network node may always configure the DRX values without assistance from the WD 22.

In another embodiment, the network node 16 can instruct the WD 22 to change back to original settings, or may use a timer to instruct the WD 22 to perform the adaptation from the beginning Or the network node 16 can sent the WD 22 a new set of parameters, e.g., via RRC or MAC CE, to repeat the above mentioned processes. Here, in case a change of configurations becomes necessary, the network node 16 can also indicate through a DCI within the preceding ON duration which setting the WD 22 should use, e.g., within the current DRX cycle.

In another embodiment, the WD 22 can go for a default setting or other setting when a certain type of service, or certain radio bearer is active. For example, for voice over Internet protocol (VoIP) services, as the traffic pattern is predictable, the WD 22 and network node 16 can agree that when a VoIP is setup the WD 22 should not try to adapt to use different sets of DRX parameters.

Figure 12:
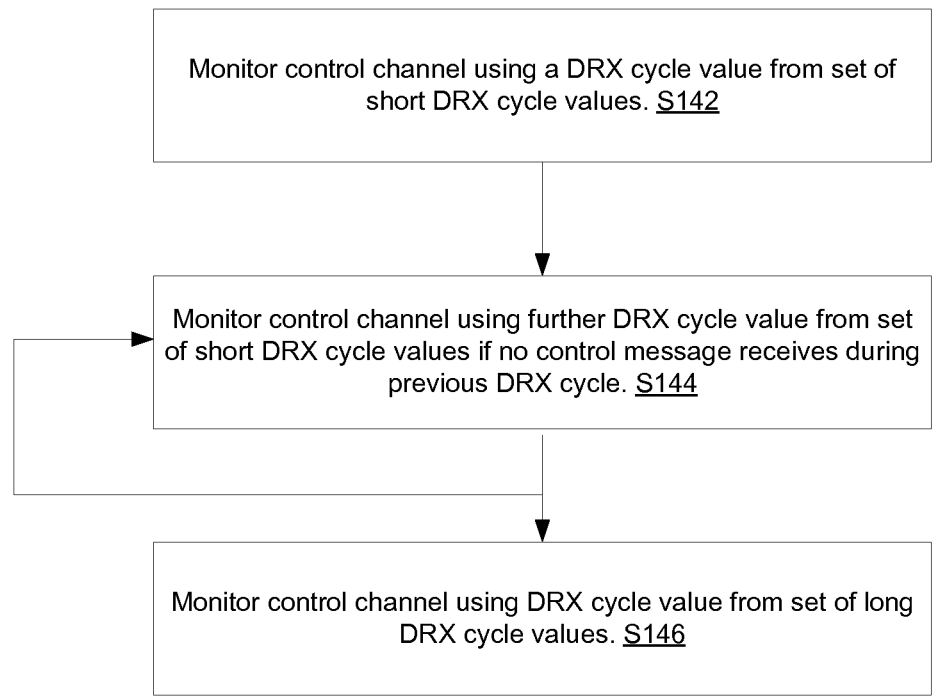
FIG. 12 is a flowchart of an exemplary process performed at a wireless device summarizing some embodiments of the present disclosure.
Figure 13:
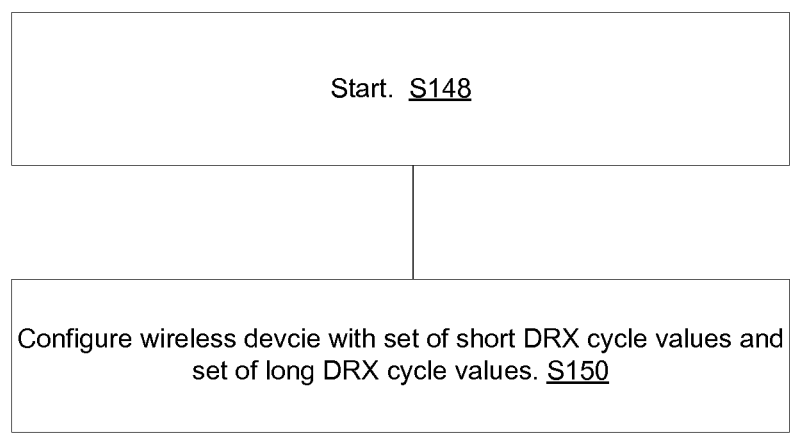
FIG. 13 a flowchart of an exemplary process performed at a network node summarizing some embodiments of the present disclosure.

FIGS. 12 and 13 show flowcharts of methods summarizing the embodiments of method 1.

FIG. 12 shows a flowchart of a method implemented at wireless device 22. The wireless device is configured with a set of short DRX cycle values and a set of long DRX cycle values. The wireless device may be configured with these sets of values in accordance with any of the examples described herein.

At Block S142 the wireless device monitors the control channel using a DRX cycle value from the set of short DRX cycle values. In other words, the wireless device monitors the control channel using a short DRX cycle, the short DRX cycle having a cycle value selected from the set.

The control channel might be a PDCCH as described above. If no control message is received on the control channel within that short DRX cycle, the wireless device monitors the control channel using a further short DRX cycle value selected from the set of short DRX cycle values (Block S144). This further DRX cycle value may be greater than the previous DRX cycle value (e.g. as shown in FIG. 11). In other words, each successively selected short DRX cycle value may be greater in length than the preceding DRX cycle value; in other words the set of short DRX cycle values can be a set of successively increasing values. As described in the examples above, the control message might be a scheduling grant (an uplink and/or downlink grant).

Step S144 might be repeated each time a control message is failed to be received within a short DRX cycle (i.e., a further short DRX cycle value might be selected from the set when no control message is received for the preceding short DRX cycle). Step S144 might be repeated for a predetermined number N of short DRX cycles, or for a predetermined amount of time, as described above.

If no control message is received within N short DRX cycles or within a predetermined amount of time, then the wireless device monitors the control channel using a DRX cycle value from the set of long DRX cycle values (Block S146). In other words, the wireless device switches from using short DRX cycle values from the set to long DRX cycle values from the set.

Similarly to step S144, step S146 might be repeated each time a control message is failed to be received within a long DRX cycle (i.e., a further long DRX cycle value might be selected from the set when no control message is received for the preceding long DRX cycle). As indicated above with respect to FIG. 11, step S146 might be repeated until a control message is received. As illustrated in FIG. 11, each successively selected long DRX cycle value may be greater in length than the preceding long DRX cycle value; in other words the set of long DRX cycle values can be a set of successively increasing values.

As explained in the examples above, the starting short DRX cycle value used by the wireless device might be configured by the network node. Similarly, the starting long DRX cycle value used by the device upon switching from using short DRX cycles to long DRX cycles might be configured by the network node.

FIG. 13 shows a flowchart of the corresponding method implemented at the network node 16. The method starts at Block S148. At Block S150, the network node configures the wireless device with a set of short DRX, cycle values for short DRX cycles and a set of long DRX cycle values for long DRX cycles for monitoring a control channel to detect a control message. Upon configuration, the wireless device can operate in accordance with the method of FIG. 12. As explained in the examples above, the network node might further configure the wireless device with a starting short DRX value to select from the set of short DRX cycle values. It may further configure the wireless device with a mechanism for selecting successive DRX cycle values from the set, if no control message is received during a preceding DRX cycle.

Figure 14:
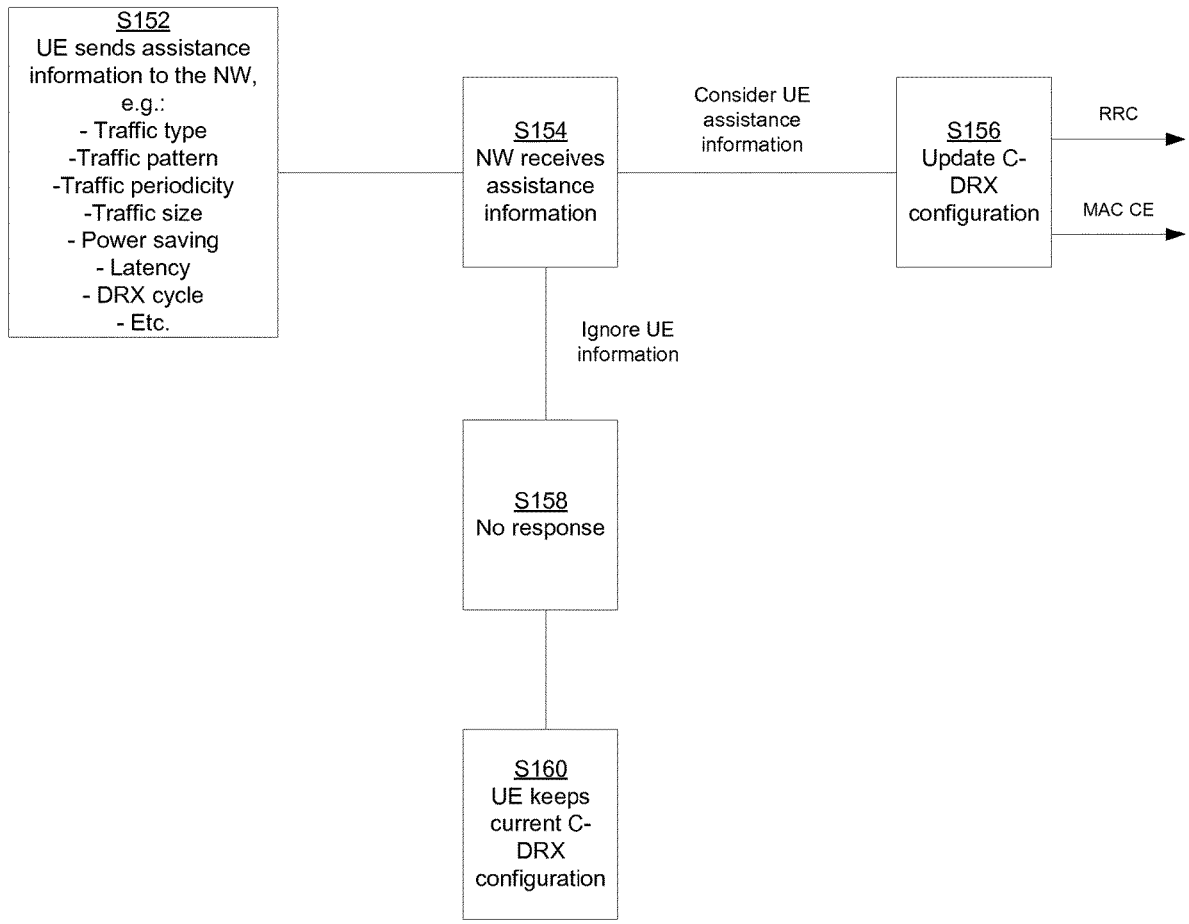
FIG. 14 is a flowchart of an exemplary process for processing DRX cycles at a network node.

Method 2:

FIG. 14 is flowchart of one embodiment of Method 2. In this method, the WD 22 is configured through RRC/MAC CE or may be reconfigured through a PDCCH based DCI. Then, the WD 22 can autonomously work based on settings configured by the network node 16. The network node can communicate with the WD 22 relatively frequently in this method, providing assistance. In this case, C-DRX reconfiguration can be caused to occur more frequently if the network node 16 chooses. In any case, the network node 16 may remain in full control for making the decision and communicating with the WD 22 about the C-DRX reconfiguration.

The WD 22 can provide assistance information to the network node 16 which may be relevant in determining the C-DRX cycles (Block S152). This assistance information can be for example as follows (it can of course include all or part of them):

Traffic type (e.g. streaming, bulk, interactive, voice, etc.)
Traffic pattern (e.g. 1 UL, 1 DL, 1 UL+1 DL, 1 UL+more, 1 DL+more, etc.)
Traffic periodicity (e.g. periodic, non-periodic, random, etc.)
Traffic size (e.g. UL packet size (mean, fixed), DL packet size (mean, fixed))
Power saving (e.g. battery power, not battery powered, remaining battery power, etc.)
Latency (e.g. delay tolerant, not delay tolerant, minimum response time, etc.)
DRX cycle (e.g. maximum tolerated DRX cycle, progressive DRX preferred (as in Method 2 below), aggressive DRX preferred (i.e. immediately into the longest DRX))
Etc.

The network node receives the assistance information from the WD at Block S154. The network node 16 may consider these parameters in order to determine the C-DRX cycle for this WD 22. However, the network node 16 can also ignore this information in part or all together when determining the C-DRX cycle. In this case, the network node might provide no response to the WD (Block S158), and the WD keeps its current C-DRX configuration (Block S160).

If the network node 16 decides to consider the WD assistance information, then after the network node 16 has decided the values of the DRX cycle number and durations, the network node 16 can communicate the values to the WD 22 either through RRC signaling which is slow but more reliable, or through MAC CE, which is a faster mechanism (Block S156). This causes the WD to update its C-DRX configuration. If the reconfiguration is urgent, the WD 22 could also select a DRX cycle configuration in the preceding ON duration. Nevertheless, if the network node 16 does not want to change the C-DRX cycles based on a WD 22 report, the network node does not need to initiate any process and the WD 22 may continue working in the current C-DRX configuration.

In another embodiment of Method 1, the network node 16 initiates a request to the WD 22 for the assistance information, and then the WD 22 provides the information. The rest of the procedure remains as described above.

In another embodiment, the network node 16 monitors the history of WD behavior such as type of traffic and traffic pattern and latency and, without explicit WD assistance, produces a WD 22 differentiation profile. Based on this profile, the network node 16 can determine the WD C-DRX configuration more efficiently. For example, the network node 16 can learn the WD 22 traffic pattern and, based on the WD 22 history, when the WD 22 remains in RRC INACTIVE state and does not move to another cell, the network node 16 stores the WD profile in the WD 22 context for example). Of course, the learning process can also be done more dynamically during RRC CONNECTED as well.

In another embodiment, the network node 16 monitors the signal radio bearers the WD 22 sets up, and their required quality of service levels. Based on the information, the network node 16 can determine the C-DRX configurations.

In another embodiment, the WD 22 can even indicate during a connection that the configured C-DRX is e.g., too slow or too long, e.g., based on UL buffer size, or lack of power efficiency (e.g., the DRX is not long enough or not aggressive enough). This way, the network node 16 can consider this information, and perform an eminent change of C-DRX configuration either through MAC CE or DCI based signaling indicating a specific preconfigured configuration in the preceding ON duration.

Figure 15:
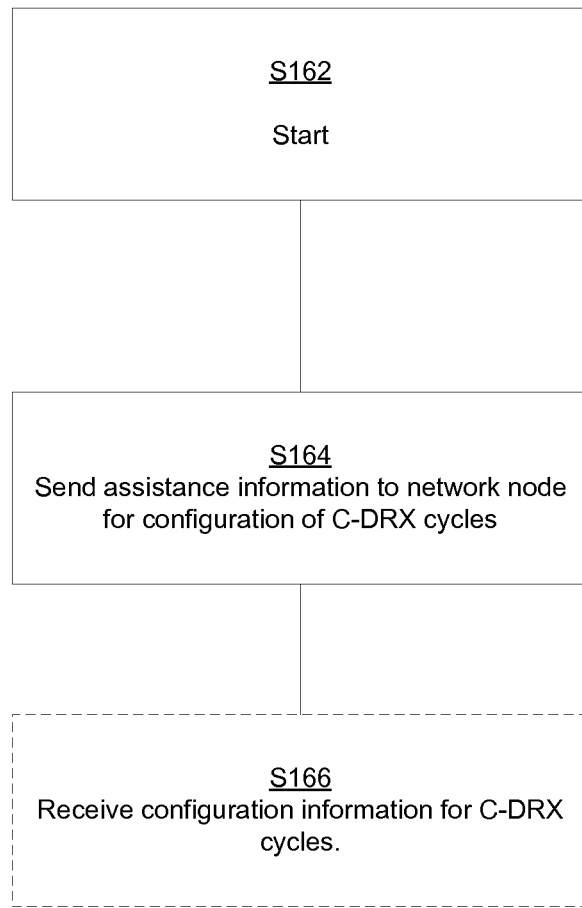
FIG. 15 a flowchart of an exemplary process performed at a wireless device summarizing some embodiments of the present disclosure.
Figure 16:
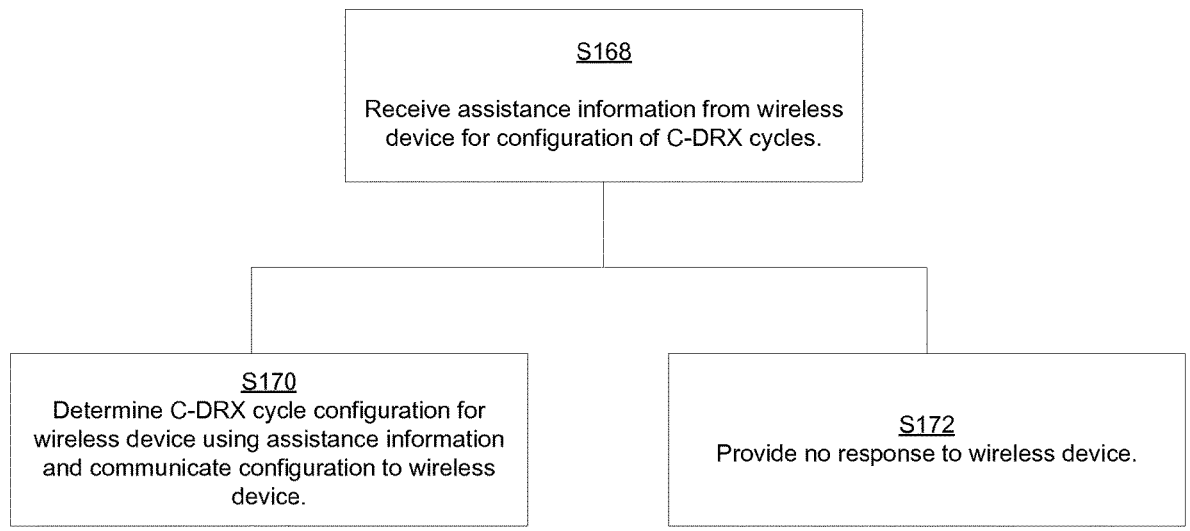
FIG. 16 a flowchart of an exemplary process performed at a network node summarizing some embodiments of the present disclosure.

FIGS. 15 and 16 show flowcharts of methods summarizing the embodiments of method 2.

FIG. 15 shows a flowchart of a method implemented at wireless device 22. The method starts at block S162. At Block S164, the wireless device sends assistance information to the network node 16 for configuration of C-DRX cycles. The assistance information may include one or more types of information listed above. In particular, in some embodiments, the assistance information includes C-DRX cycle information. The information might be the wireless device's preferred C-DRX configuration information (the network node already knowing the C-DRX cycle information currently implemented by the wireless device). As explained herein, C-DRX includes a short and a long DRX cycle; thus, preferred C-DRX configuration information might include preferred values for the short DRX cycle and the long DRX cycle. The DRX cycle information might include a maximum preferred DRX cycle value.

At optional step S166, the wireless device receives configuration information for C-DRX cycles from the network node. This step is optional because, as described above with respect to FIG. 14, the network node might decide to ignore the assistance information from the wireless device, for example depending on network conditions.

In some examples, the wireless device might send the assistance information to the network node in response to receiving a request for that assistance information.

FIG. 16 shows a flowchart of a method implemented at network node 16. At Block S168 the network node receives the assistance information from the wireless device. The assistance information is for the configuration of C-DRX cycles at the wireless device. As explained above, the assistance information can include C-DRX cycle information, for example preferred C-DRX cycle configuration information such as C-DRX cycle length value(s) (e.g. a short DRX cycle value and a long DRX cycle value).

The network node can then either: (i) determine a C-DRX cycle configuration for the device using the assistance information, and communicate the configuration to the wireless device (S170); or (ii) provide no response to the wireless device, which causes the wireless device to maintain its current C-DRX cycle configuration. As explained above with reference to FIG. 14, the network node can have control on whether to respond to the wireless device or not, for example depending on network conditions and the requirements of other devices in the network.

Thus, some embodiments provide mechanisms for reducing the number of PDCCH monitoring occasions. This in turn leads to lowering the WD power consumption to give the WD 22 a longer lifetime on a single battery charge. Further, some methods described herein provide the network with a more flexible design of C-DRX cycles. Therefore, a network node may configure the WD 22 according to the change in the traffic, WD 22 power status, etc.

Of note, Method 1 described above, does not impose a large signaling load on the network node 16. The network 16 node may configure the WD 22 once to work in this mode, and then only override it when it wants to. The WD 22 can then automatically follow the configuration set by the network node 16.

Method 2 has an advantage that it is more flexible to changing conditions such as power, bandwidth (BW), latency, traffic and so on. However, it may entail a greater signaling overhead on the network node 16. On the other hand, an expected latency of this method may be slightly better than Method 1 because of its more flexible nature.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| 3GPP | 3rd Generation Partnership Project |
| 5G | 5th Generation |
| BB | Baseband |
| BW | Bandwidth |
| CDRX | Connected mode DRX (i.e. DRX in RRC_CONNECTED state) |
| CRC | Cyclic Redundancy Check |
| DCI | Downlink Control Information |
| DL | Downlink |
| DRX | Discontinuous Reception |
| gNB | A radio base station in 5G/NR. |
| HARQ | Hybrid Automatic Repeat Request |
| IoT | Internet of Things |
| LO | Local Oscillator |
| LTE | Long Term Evolution |
| MAC | Medium Access Control |
| MCS | Modulation and Coding Scheme |
| mMTC | massive MTC (referring to scenarios with ubiquitously deployed MTC devices) |
| ms | millisecond |
| MTC | Machine Type Communication |
| NB | Narrowband |
| NB-IoT | Narrowband Internet of Things |
| NR | New Radio |
| NW | Network |
| PDCCH | Physical Downlink Control Channel |
| PDSCH | Physical Downlink Shared Channel |
| RF | Radio Frequency |
| RNTI | Radio Network Temporary Identifier |
| RRC | Radio Resource Control |
| RX | Receiver/Reception |
| SSB | Synchronization Signal Block |
| T/F | Time/Frequency |
| TX | Transmitter/Transmission |
| UE | User Equipment |
| UL | Uplink |
| WU | Wake-up |
| WUG | Wake-up Group |
| WUR | Wake-up Radio/Wake-up Receiver |
| WUS | Wake-up Signal/Wake-up Signaling |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings. Some example embodiments in accordance with the present disclosure are provided below.

EMBODIMENTS

Embodiment A1. A network node configured to communicate with a wireless device (WD), the network node configured to, and/or comprising a radio interface and/or comprising processing circuitry configured to:

configure a first set of short discontinuous reception, DRX, cycles and a second set of long DRX cycles, each DRX cycle having a duration for which the WD listens for an uplink grant from the network node; and transmit to the WD at least a number of DRX cycles in the first set and a number of cycles in the second set.

Embodiment A2. The network node of Embodiment A1, wherein the network node is further configured to transmit to the WD a duration of time of each DRX cycle in the first and second sets.

Embodiment A3. The network node of Embodiment A1, wherein the network node is further configured to transmit to the WD a start time of a DRX cycle.

Embodiment A4. The network node of Embodiment A1, wherein transmission of the number of DRX cycles is via downlink control information, DCI, on a physical downlink control channel, PDCCH.

Embodiment A5. The network node of Embodiment A1, wherein the network node is further configured to receive information from the WD, the information being used to configure at least one of the first and second sets of DRX cycles.

Embodiment A6. The network node of Embodiment A5, wherein the information includes at least one of WD power, type of traffic and latency.

Embodiment B1. A method implemented in a network node, the method comprising:

configuring a first set of short discontinuous reception, DRX, cycles and a second set of long DRX cycles, each DRX cycle having a duration for which the WD listens for an uplink grant from the network node; and transmitting to the WD at least a number of DRX cycles in the first set and a number of cycles in the second set.

Embodiment B2. The method of Embodiment B1, wherein the network node is further configured to transmit to the WD a duration of time of each DRX cycle in the first and second sets.

Embodiment B3. The method of Embodiment B1, wherein transmission of the number of DRX cycles is via downlink control information, DCI, on a physical downlink control channel, PDCCH.

Embodiment B4. The method of Embodiment B1, wherein the network node is further configured to transmit to the WD a start time of a DRX cycle.

Embodiment B5. The method of Embodiment B1, wherein the network node is further configured to receive information from the WD, the information being used to configure at least one of the first and second sets of DRX cycles.

Embodiment B6. The method of Embodiment B5, wherein the information includes at least one of WD power, type of traffic and latency.

Embodiment C1. A wireless device (WD) configured to communicate with a network node, the WD configured to, and/or comprising a radio interface and/or processing circuitry configured to:

for each of at least two successive short discontinuous reception cycle, DRX, durations, listen for a grant on a physical downlink control channel, PDCCH; and if no grant is received during any short DRX cycle, then listen for the grant during at least one successive long DRX cycle.

Embodiment C2. The WD of Embodiment C1, wherein a number of short DRX cycles and a number of long DRX cycles is received from the network node.

Embodiment C3. The WD of Embodiment C1, wherein a start time of a DRX cycle is received from the network node.

Embodiment C4. The WD of Embodiment C1, wherein, when the WD receives a grant during a DRX, the WD returns to a default status in which it ceases listening for a grant for a predetermined duration.

Embodiment C5. The WD of Embodiment C1, wherein each successive DRX cycle duration is longer than a previous DRX cycle duration.

Embodiment C6. The WD of Embodiment C1, wherein the WD is further configured to provide information to the network node, the information being used to configure at least one of the first and second sets of DRX cycles.

Embodiment C7. The WD of Embodiment C6, wherein the information includes at least one of WD power, type of traffic and latency.

Embodiment D1. A method implemented in a wireless device (WD), the method comprising:

for each of at least two successive short discontinuous reception cycle, DRX, durations, listening for a grant on a physical downlink control channel, PDCCH; and if no grant is received during any short DRX cycle, then listening for the grant during at least one successive long DRX cycle.

Embodiment D2. The method of Embodiment D1, wherein a number of short DRX cycles and a number of long DRX cycles is received from the network node.

Embodiment D3. The method of Embodiment D1, wherein a start time of a DRX cycle is received from the network node.

Embodiment D4. The method of Embodiment D1, wherein, when the WD receives a grant during a DRX, the WD returns to a default status in which it ceases listening for a grant for a predetermined duration.

Embodiment D5. The method of Embodiment D1, wherein each successive DRX cycle duration is longer than a previous DRX cycle duration.

Embodiment D6. The method of Embodiment D1, wherein the WD is further configured to provide information to the network node, the information being used to configure at least one of the first and second sets of DRX cycles.

Embodiment D7. The method of Embodiment D6, wherein the information includes at least one of WD power, type of traffic and latency.

The invention claimed is:

1. A method implemented in a wireless device (WD) a control channel during discontinuous reception, DRX, cycle periods, each DRX cycle period comprising an on-duration and an off-duration;
setting a set of short DRX cycle periods for short DRX cycles;
setting an initial long DRX cycle value for long DRX cycles, the initial long DRX cycle value being longer than the set of short DRX cycle periods;
monitoring the control channel during the on-duration of one or more DRX cycles having a first short DRX cycle value selected from the set of short DRX cycle periods;
if no control message is received using the first short DRX cycle value, monitoring the control channel during the on-durations of one or more DRX cycles having a second short DRX cycle value selected from the set of short DRX cycle periods, the second short DRX cycle value being longer than the first short DRX cycle value; and
if no control message is received using the second short DRX cycle value, monitoring the control channel during the on-duration of one or more DRX cycles having the initial long DRX cycle value.

2. The method of claim 1, wherein the set of short DRX cycle periods defines a set of increasing short DRX cycle durations; and
the set of long DRX cycle periods defines a set of increasing long DRX cycle durations.

3. The method of claim 1, further comprising being configured by a network node with a starting short DRX cycle value from the set of short DRX cycle periods to monitor the control channel.

4. The method of claim 1, further comprising being configured by a network node with an approach to select the second short DRX cycle from the set of short DRX cycle periods.

5. The method of claim 1, wherein the control channel is a physical downlink control channel (PDCCH) and the control message is one of an uplink and downlink grant.

6. The method of claim 1, further comprising:
setting a set of long DRX cycle periods for long DRX cycles, the set of long DRX cycle periods comprising the initial long DRX cycle value; and
if no control message is received using the initial long DRX cycle value, monitoring the control channel during the on-duration of one or more DRX cycles having a second long DRX value period selected from the set of long DRX cycle periods, the second long DRX cycle value being longer than the initial long DRX cycle value.

7. The method of claim 6, wherein the set of long DRX cycle periods is a set of increasing long DRX cycle periods.

8. The method of claim 1, further comprising being configured by a network node with the set of short DRX cycle periods.

9. The method of claim 8, further comprising providing assistance information to the network node for determining the set of short DRX periods.

10. The method of claim 8, further comprising being configured by the network node with the set of long DRX cycle periods.

11. The method of claim 10, further comprising being configured by the network node with the set of long DRX cycle periods through radio resource control (RRC) signaling.

12. A wireless device, WD, configured for monitoring a control channel during discontinuous reception, DRX, cycle periods, each DRX cycle period comprising an on-duration and an off-duration, the WD configured to:
set a set of short DRX cycle periods for short DRX cycles;
set an initial long DRX cycle value for long DRX cycles, the initial long DRX cycle value being longer than the short DRX cycle periods;
monitor the control channel during the on-duration of one or more DRX cycles having a first short DRX cycle value selected from the set of short DRX cycle periods;
if no control message is received using the first short DRX cycle value, monitor the control channel during the on-durations of one or more DRX cycles having a second short DRX cycle value selected from the set of short DRX cycle periods, the second short DRX cycle value being longer than the first short DRX cycle value;
if no control message is received using the second short DRX cycle period, monitor the control channel during the on-duration of one or more DRX cycles having the initial long DRX cycle value.

13. The wireless device of claim 12, wherein the wireless device is configured by a network node with the set of short DRX cycle periods.

14. The wireless device of claim 12, wherein the set of short DRX cycle periods is a set of increasing short DRX cycle periods.

15. The wireless device of claim 12, wherein the control channel is a physical downlink control channel (PDCCH) and the control message is one of an uplink and downlink grant.

16. The wireless device of claim 12, further configured to:
set a set of long DRX cycle periods for long DRX cycles, the set of long DRX cycle periods comprising the initial long DRX cycle value; and
if no control message is received using the initial long DRX cycle value, monitor the control channel during the on-duration of one or more DRX cycles having a second long DRX cycle value selected from the set of long DRX cycle periods, the second long DRX cycle value being longer than the initial long DRX cycle value.

17. The wireless device of claim 16, wherein the set of long DRX cycle values periods is a set of increasing long DRX cycle periods.

18. The wireless device of claim 12, further comprising being configured by a network node with the set of short DRX cycle periods through radio resource control (RRC) signaling.

19. The wireless device of claim 16, further comprising being configured by a network node with the set of long DRX cycle periods through radio resource control (RRC) signaling.

* * * * *